United States Patent
Donner

[11] Patent Number: 6,144,297
[45] Date of Patent: Nov. 7, 2000

[54] AUTOMOBILE STEERING WHEEL AND TURN SIGNAL BUTTONS WITH TURNING INDICIA AND/OR INDICATORS THEREON

[76] Inventor: Irah H. Donner, 11601 Yeatman Ter., Silver Spring, Md. 20902

[21] Appl. No.: 09/347,191

[22] Filed: Jul. 2, 1999

Related U.S. Application Data

[63] Continuation of application No. 09/132,247, Aug. 11, 1998.
[60] Provisional application No. 60/056,541, Aug. 19, 1997.

[51] Int. Cl.$^7$ ..................................................... B60Q 1/34
[52] U.S. Cl. .......................... 340/475; 340/477; 340/468; 340/309.15; 200/61.27
[58] Field of Search ..................................... 340/475, 477, 340/478, 468, 309.15; 200/61.27, 61.32

[56] References Cited

U.S. PATENT DOCUMENTS

| | | | |
|---|---|---|---|
| D. 286,526 | 11/1986 | Wardle et al. | D12/176 |
| D. 289,029 | 3/1987 | Envall et al. | D12/176 |
| D. 306,715 | 3/1990 | Vian | D12/176 |
| D. 342,474 | 12/1993 | Oki | D12/176 |
| 4,063,789 | 12/1977 | Kreisl | 339/200 |
| 4,684,918 | 8/1987 | Solomon | 340/73 |
| 5,438,314 | 8/1995 | Evans | 340/477 |
| 5,469,338 | 11/1995 | Sims | 362/200 |
| 5,823,666 | 10/1998 | Kingsolver | 362/488 |
| 5,835,028 | 11/1998 | Bender et al. | 340/475 |

*Primary Examiner*—Daryl Pope
*Attorney, Agent, or Firm*—Hale and Dorr LLP

[57] ABSTRACT

An automobile steering wheel and turn signal indicator for allowing a driver of an automobile to signal for a turn, includes a handle/hub arrangement adapted to be coupled to a steering column of the automobile, spokes disposed about the handle/hub and horizontally extended outward therefrom to the handle, and left and right turn signal indicators disposed on at least one of the handle, hub and spokes of the steering wheel. Each of the left and right turn signal indicators is equipped with or positionally near with at least one of indicia indicative of the appropriate direction when the steering wheel changes orientation, turn signal lights indicative of a working status of the left and right turn signal indicators, indicia indicative of the appropriate direction when the steering wheel changes orientation and substantially simultaneously indicative of a working status of the left and right turn signal indicators, an optional vibration device vibrating the turn signal buttons, and an optional hazard function activating substantially simultaneously the left and right turn signal indicators.

15 Claims, 11 Drawing Sheets

AUTOMOBILE STEERING WHEEL AND TURN SIGNAL BUTTONS WITH TURNING INDICIA AND/OR INDICATORS THEREON

This application is a continuation of U.S. application Ser. No. 09/132,247, filed Aug. 11, 1998 which in turn claims priority to U.S. application Ser. No. 60/056,541, filed Aug. 19, 1997, incorporated herein by reference.

FIELD OF THE INVENTION

The present invention relates to an automobile steering wheel and turn signal button, and more particularly, relates to allowing a driver of an automobile to reliably signal for a turn without substantially removing his/her hands from the steering wheel. The present invention also relates to providing the driver feedback with respect to the appropriate turn signal button to use and which turn signal may be currently activated, without requiring the driver to view an area that is substantially different and/or removed from the turn signal button.

BACKGROUND OF THE RELATED ART

The use of signalling devices is known in the prior art. More specifically, signalling devices heretofore devised and utilized for the purpose of allowing a driver of an automobile to signal for a turn are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 286,526 to Wardle et al. discloses an automobile steering wheel. U.S. Pat. No. Des. 289,029 to Envall et al. discloses an automobile steering wheel. U.S. Pat. No. Des. 306,715 to Vian discloses an automobile steering wheel. U.S. Pat. No. Des. 342,474 to Oki discloses a steering wheel with display panel. U.S. Pat. No. 4,063,789 to Kreisl discloses a signalling arrangement for automotive vehicle steering wheels.

U.S. Pat. No. 5,469,338 to Sims discloses an automobile steering wheel and turn signal indicator, as illustrated in FIG. 1. In FIG. 1, steering 12 wheel is adapted for use with an automobile. The steering wheel 12 has an annular handle 14 for allowing a user a firm grip. The steering wheel has a generally circular central hub 16 adapted to be coupled to a steering column of an automobile. A first pair of spokes 18 is symmetrically disposed about the hub and horizontally extended outward therefrom to the handle to form an angle of 180 degrees therebetween for supporting the handle in a stationary configuration. A second pair of spokes 20 is also included and symmetrically disposed about the hub below the first pair of spokes and angularly extended downwards and outward therefrom to the handle to form an angle of 60 degrees therebetween.

Each spoke of the first pair and the second pair has a length equal to the radial extent of the hub. The steering wheel also includes a diametrical pair of recessed switch holes 22 disposed on the hub near the periphery thereof. The switch holes are aligned with the first pair of spokes and adapted to receive a turn signal indicator therein.

The turn signal indicator 30 is electrically conductive. It is formed of a pair of disk-shaped push button switches. Each push button switch is extended through a separate switch hole 22 to thereby define a right push button switch 32 and a left push button switch 34. See also U.S. Pat. No. 4,684,918 having a similar arrangement, the details of which are hereby incorporated by reference.

While these devices fulfill their respective, particular objective and requirements, the aforementioned patents do not describe an automobile steering wheel and turn signal indicator that allows a driver to activate the right or left turn signals without removing his/her hands from the steering wheel. For example, I have discovered that the steering wheel in the Sims patent provides no indication of which push button is associated with the left or right turn signal. Thus, after the steering has been turned even 90 degrees, potential confusion may result as illustrated in FIG. 2 via reference numeral 24. As illustrated in FIG. 3, after the steering wheel has been rotated 180 degrees via reference numeral 26, the turn signal buttons 32, 34 have reversed their positions, further creating confusion and possibly incorrect turning signals.

In addition, in the Sims patent, the user is required to view the turn signal lights in an area that is apart from the turn signal buttons, thereby requiring the driver to pay less attention to the road, and thereby increasing the likelihood of potential accident.

The Sims patent also fails to provide the driver feedback with respect to the appropriate turn signal button to use and which turn signal may be currently activated. That is, in the Sim patent, the driver is required to view an area that is substantially different and/or removed from the turn signal button.

In this respect, the automobile steering wheel and turn signal buttons according to the present invention substantially departs from the conventional concepts and designs of the prior art, and in doing so provides an apparatus primarily developed for the purpose of allowing a driver of an automobile to signal for a turn without removing his hands from the steering wheel, and providing more effective feedback to the driver.

Therefore, it can be appreciated that there exists a continuing need for new and improved automobile steering wheel and turn signal buttons which can be used for allowing a driver of an automobile to signal for a turn without removing his/her hands from the steering wheel. In this regard, the present invention substantially fulfills this need.

SUMMARY OF THE INVENTION

In the view of the foregoing disadvantages inherent in the known types of signalling devices now present in the prior art, the present invention provides an improved automobile steering wheel and turn signal button. As such, the general purpose of the present invention, which will be described subsequently in greater detail, is to provide a new and improved automobile steering wheel and turn signal indicator and method which has all the advantages of the prior art and none of the disadvantages.

To attain this, the present invention essentially comprises, in combination, an automobile steering wheel having an annular handle, a hub adapted to be coupled to a steering column of an automobile, spokes disposed about the hub and horizontally extended outward therefrom to the handle, and a switch holes or cavities disposed on the hub, handle and/or spokes near the periphery thereof. A turn signal indicator is included and formed of a pair of push button switches with each push button switch extended through a separate switch hole to thereby define a left push button switch and a right push button switch.

The right push button switch has or actuates an electrically conductive terminal adapted to be coupled between flasher circuitry and right turn signal lights of an automobile. The left push button switch has or actuates an electrically conductive terminal adapted to be coupled between flasher circuitry and left turn signal lights of an automobile. The right push button switch is adapted for completing a circuit between the right turn signal lights, flasher circuitry, and power supply of an automobile to thereby activate the right turn signal lights, and is adapted for breaking the circuit to thereby de-activate the right turn signal lights. The left push button switch is adapted for completing a circuit between the left turn signal lights, flasher circuitry, and power supply of an automobile to thereby activate the left turn signal lights and is also adapted for breaking the circuit to thereby de-activate the left turn signal lights.

When a driver wishes to indicate a right turn, he/she can depress the right push button switch while simultaneously or substantially holding the steering wheel with both hands. When a driver wishes to indicate a left turn, he/she can depress the left push button switch while simultaneously or substantially holding the steering wheel with both hands. Significantly, the driver is also able to determine the appropriate turn button to activate when the steering wheel changes orientation.

In accordance with another embodiment, the driver is provided feedback in an area that is substantially close to the turn signal buttons indicative of the working status of the turn signal. For example, lights are provided that illuminate the turn signal button that has been activated on the steering wheel. The driver therefore need not remove and/or shift his/her eyes from the turn signal indicators to determine working status of same.

In an even further embodiment, a vibration device is provided which vibrates the turn signal buttons. Advantageously, according to this embodiment, the driver need not even look at the turn signal button to determine working status of the turn signal.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automobile steering wheel and turn signal buttons/switches which has all the advantages of the prior art signalling devices and none of the disadvantages.

It is another object of the present invention to provide a new and improved automobile steering wheel and turn signal buttons/switches which may be easily and efficiently manufactured and marketed.

It is a further object of the present invention to provide a new and improved automobile steering wheel and turn signal buttons/switches which is of durable and reliable construction.

An even further object of the present invention is to provide a new and improved automobile steering wheel and turn signal buttons/switches which is susceptible of a low cost of manufacture with regard to both materials and labor, and which accordingly is then susceptible of low prices of sale to the consuming public, thereby making such an automobile steering wheel and turn signal buttons economically available to the buying public.

Still yet another object of the present invention is to provide a new and improved automobile steering wheel and turn signal buttons/switches which provides in the apparatuses and methods of the prior art some of the advantages thereof, while simultaneously overcoming some of the disadvantages normally associated therewith.

Even still another object of the present invention is to provide a new and improved automobile steering wheel and turn signal buttons/switches for allowing a driver of an automobile to signal for a turn without substantially removing his hands from the steering wheel.

It is another object of the present invention to provide a new and improved automobile steering wheel and turn signal buttons/switches including an automobile steering wheel having a handle, a hub adapted to be coupled to a steering column of an automobile, spokes disposed about the hub and horizontally extended outward therefrom to the handle, and a switch holes or cavities disposed on the hub, handle and/or spokes near the periphery thereof. A turn signal indicator is included and formed of a pair of push button switches with each push button switch extended through a separate switch hole to thereby define a left push button switch and a right push button switch. The left and right buttons/switches are equipped with indicia indicative of the appropriate direction when the steering wheel changes orientation. Turn lights/indicators are optionally provided either below or near the turn signal switches indicating working status of same. A vibration device is optionally provided which vibrates the turn signal buttons. Further, a hazard function is also provided to activate both turn signal indicators on the steering wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The same reference numerals refer to the same parts through the various Figures.

BEST MODE FOR CARRYING OUT THE INVENTION

Figure 1:
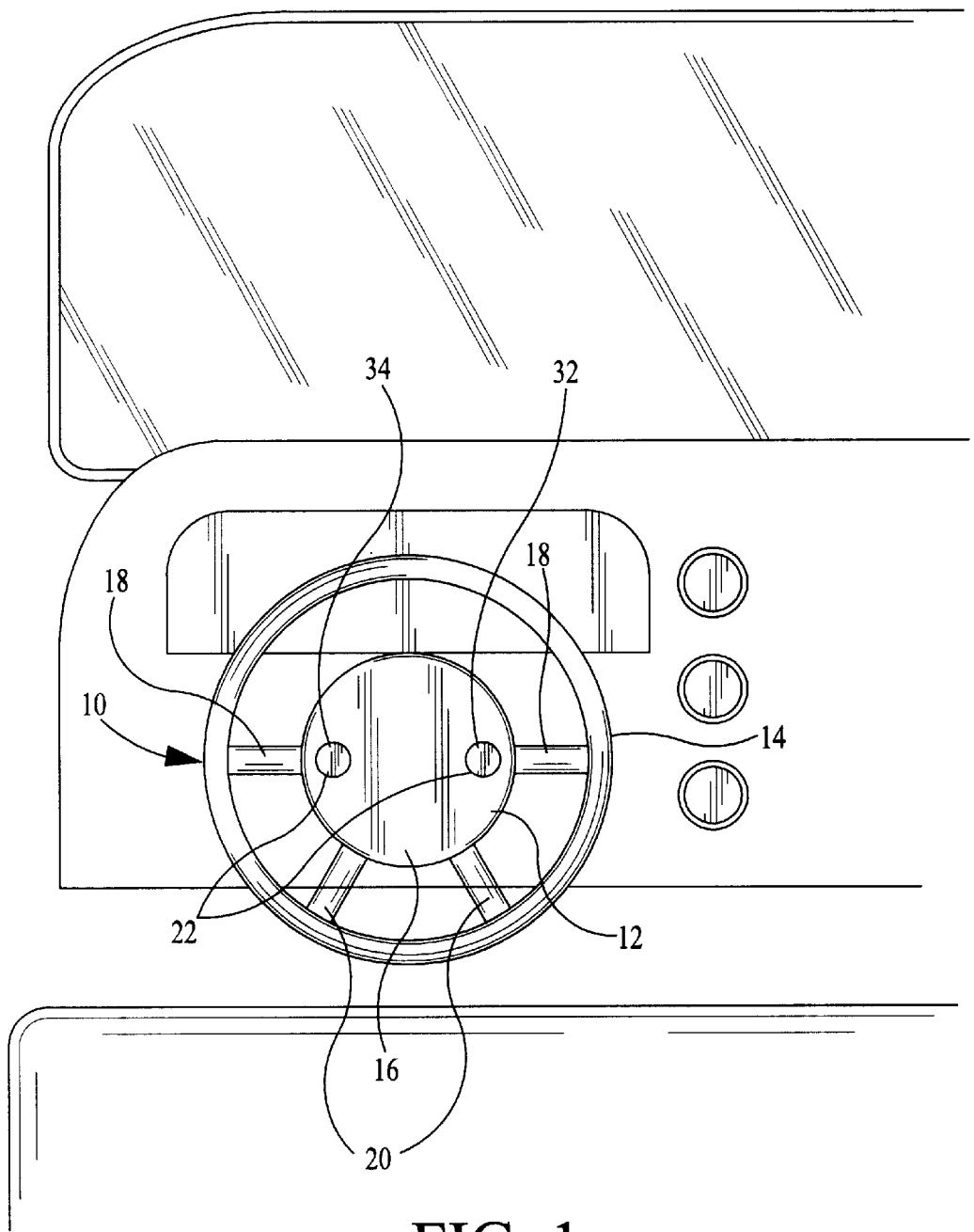
FIG. 1 is a side-elevational view of prior art turn signal buttons/switches secured to a steering column within the driver's compartment of an automobile.
Figure 2:
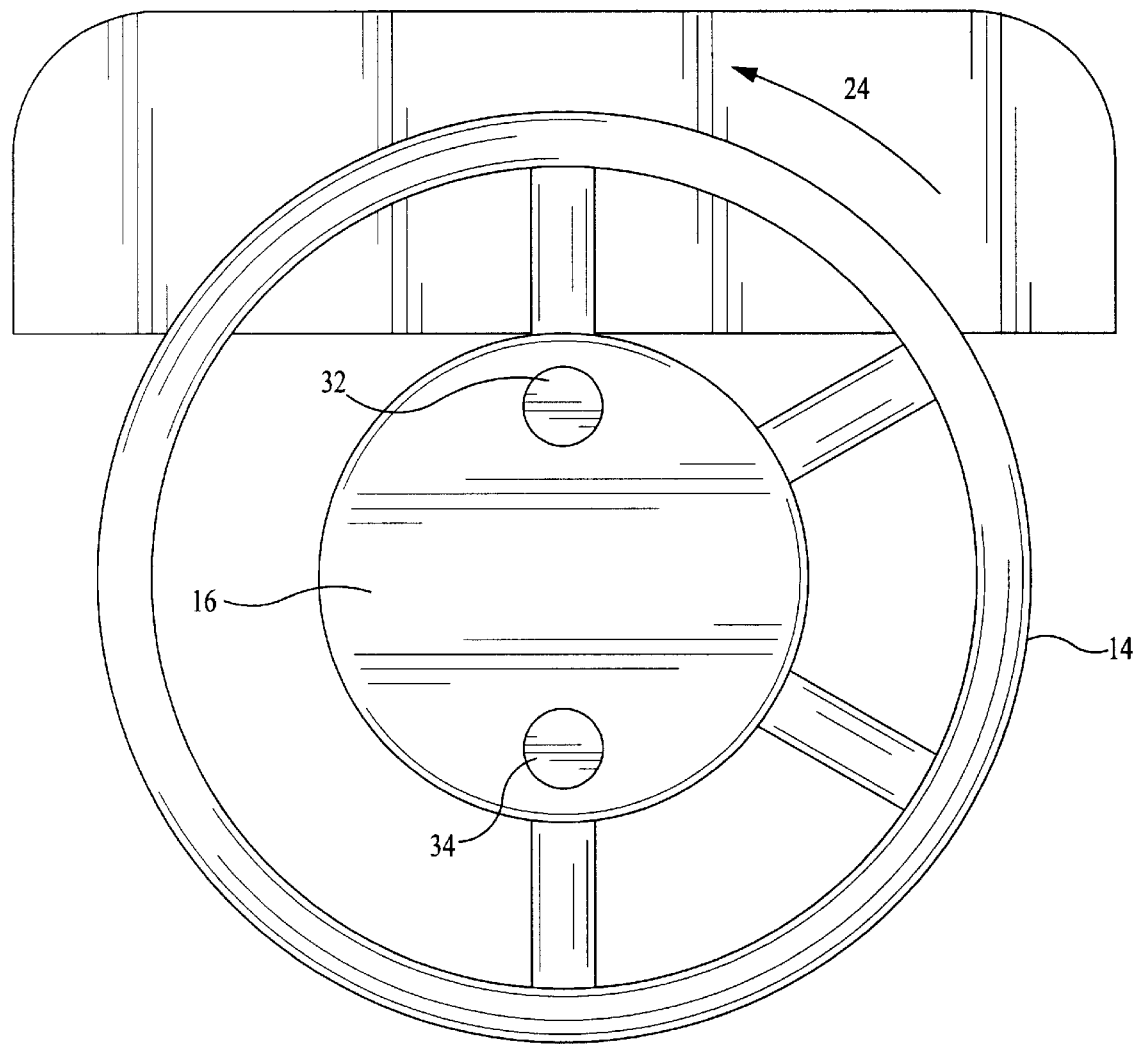
FIG. 2 is a side-elevational view of prior art turn signal buttons/switches secured to a steering column within the driver's compartment of an automobile after a first change in orientation.
Figure 3:
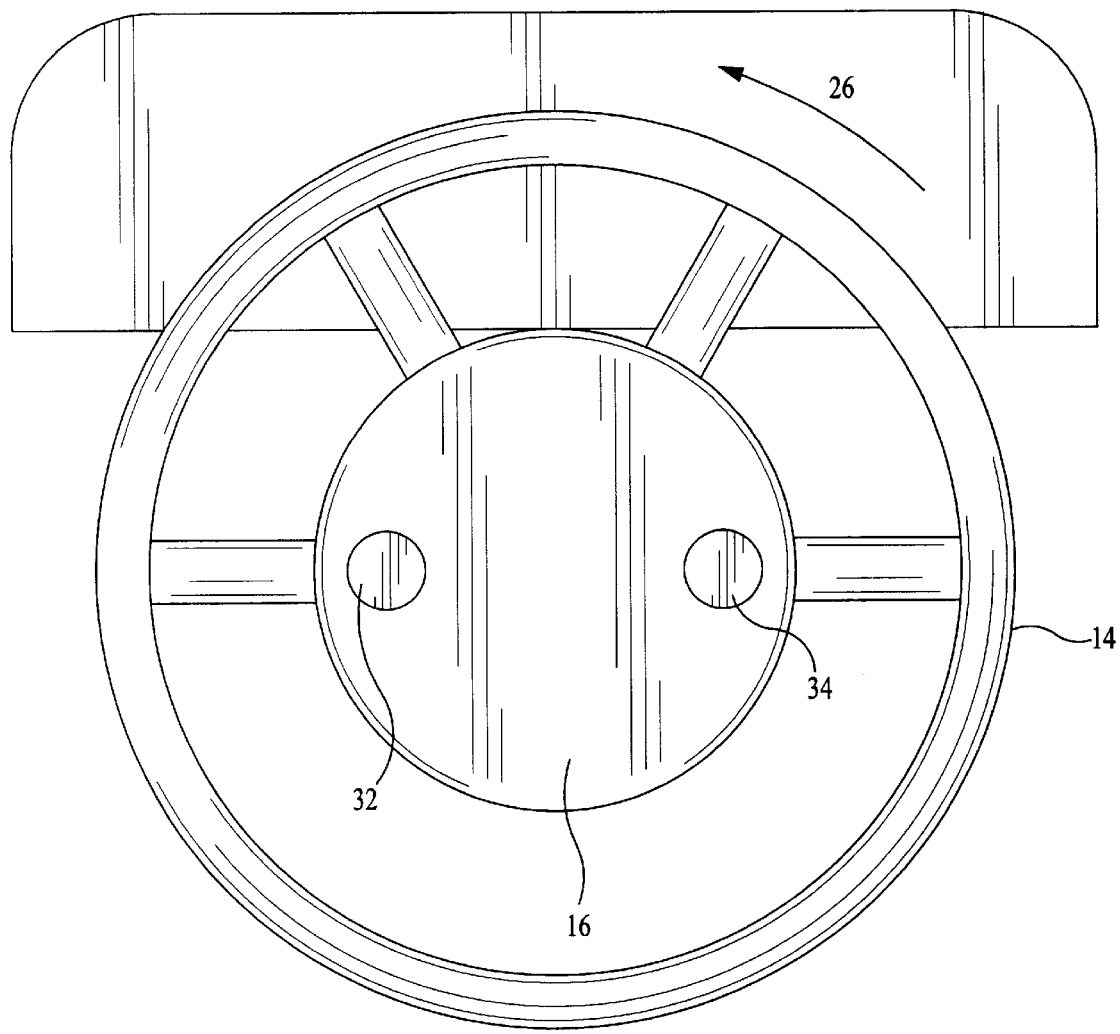
FIG. 3 is a side-elevational view of prior art turn signal buttons/switches secured to a steering column within the driver's compartment of an automobile after a second change in orientation.

With reference now to the drawings, and in particular, to FIG. 3 thereof, the preferred embodiment of the new and improved automobile steering wheel and turn signal button/switch embodying the principles and concepts of the present invention will be described.

Specifically, the present invention includes two major components. The major components are the steering wheel and the turn signal indicators/buttons. These components are interrelated to provide the intended function.

More specifically, it will be noted in the various Figures that the first major component is the steering wheel 14a. The steering wheel is adapted for use with an automobile. The steering wheel has an annular handle for allowing a user a firm grip. The steering wheel has a generally circular central hub 16a adapted to be coupled to a steering column of an automobile. A first pair of spokes is optionally symmetrically disposed about the hub and horizontally extended outward therefrom to the handle to form an angle of, for example, 180 degrees therebetween for supporting the handle in a stationary configuration.

A second pair of spokes is also optionally included and symmetrically disposed about the hub below the first pair of spokes and angularly extended downwards and outward therefrom to the handle to form, for example, an angle of 60 degrees therebetween. Each spoke of the first pair and the second pair has a length equal to the radial extent of the hub.

Note that the specific configuration and/or shape of the steering wheel, central hub, and spokes may be of any suitable shape. In addition, the switches may optionally be disposed on the spokes and/or steering column.

The second major component is the turn signal indicator. The turn signal indicator is, for example, electrically conductive. It is formed of a pair of disk-shaped push button switches 32a, 34a. The steering wheel includes the diametrical pair of switches 32a, 34a disposed, for example, on the hub near the periphery thereof. The switches are, for example, aligned with the first pair of spokes, and adapted to receive a turn signal indicator thereon. Each push button switch is extended through a separate switch hole to thereby define a right push button switch 32a and a left push button switch 34a.

Figure 4:
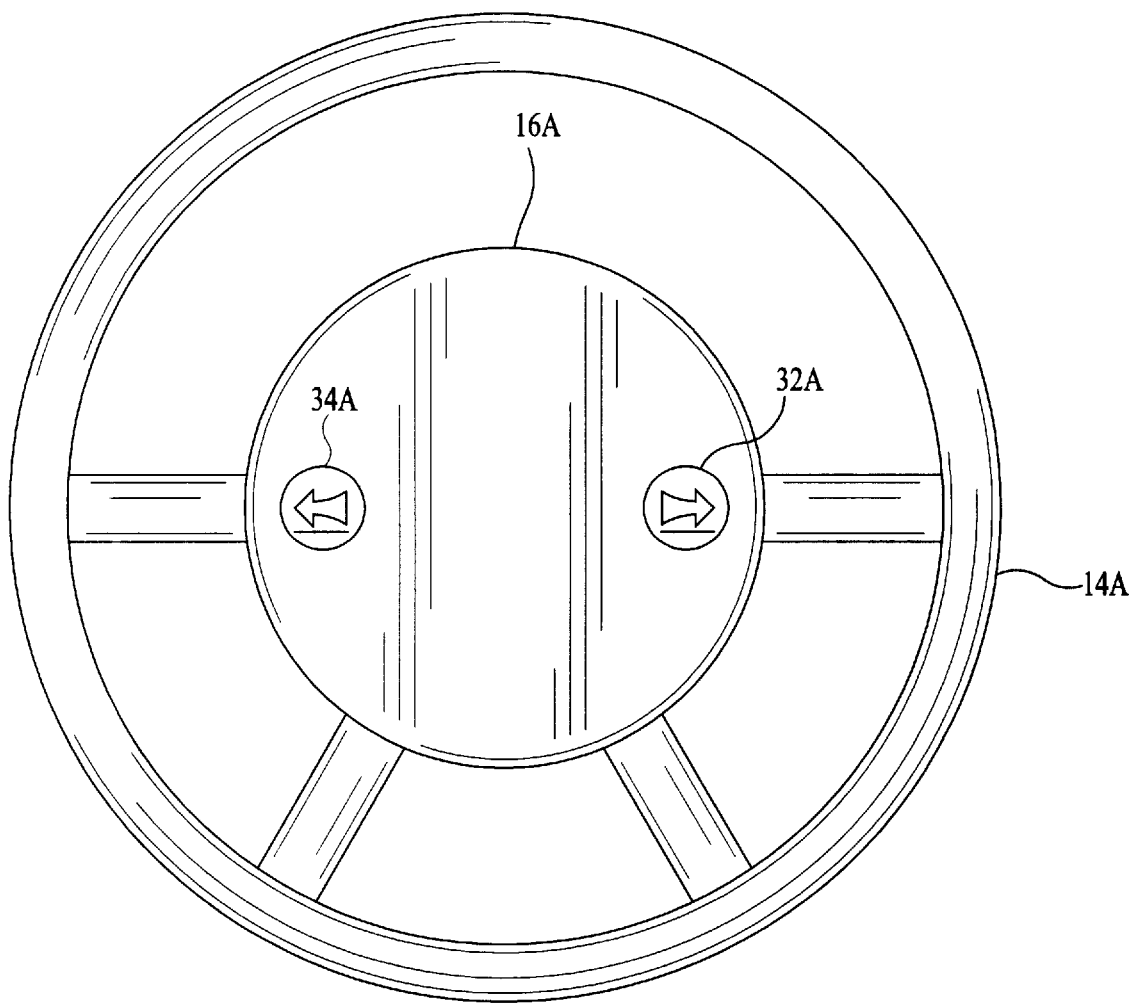
FIG. 4 is a side-elevational view of the turn signal buttons/switches secured to a steering column within the driver's compartment of an automobile in accordance with a first embodiment.

Advantageously, as illustrated in FIG. 4, the switches 32a, 34a include indicia that functionally relate to the structure, position and/or identification. For example, switch 32a includes right arrow with a bar/line underneath so that even when the steering wheel is rotated, the driver will still be able to determine or identify switch 32a for a right turn. Similarly, switch 34a includes left arrow with a bar/line underneath so that even when the steering wheel is rotated, the driver will still be able to determine or identify switch 34a for a left turn.

Another important advantage is the placement of the indicia, marking or other indicator on the area of the steering wheel which is generally within the perpheral vision of the automobile driver. For example, in accordance with one embodiment of the invention, the indicia, markings, symbols and/or other indicators are positioned on the steering wheel which the driver can easily determine whether the directional is working or not. This then makes the driving of the automobile advantageously safer if the driver does not have to move his/her eyes further away, for example, on the dashboard area.

Figure 5:
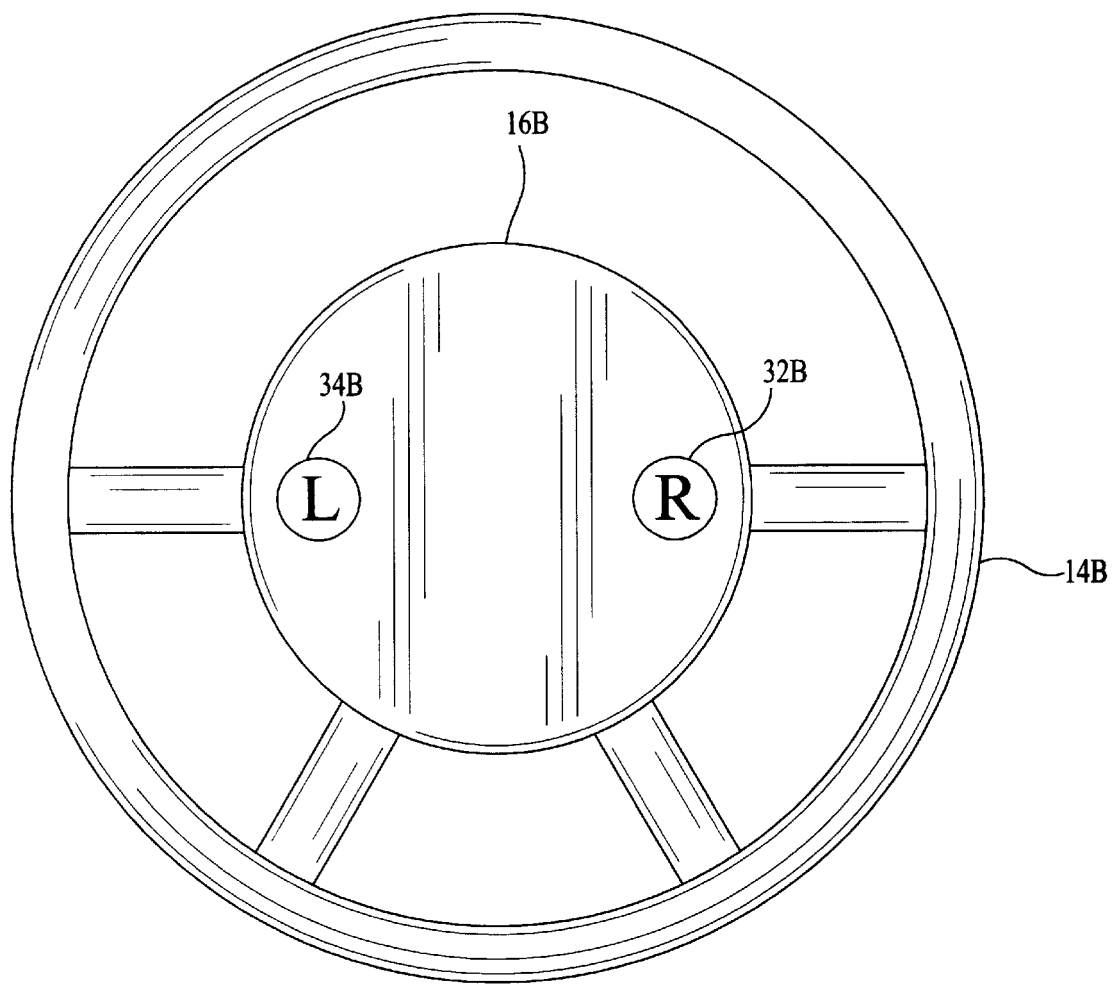
FIG. 5 is a side-elevational view of the turn signal buttons/switches secured to a steering column within the driver's compartment of an automobile in accordance with a second embodiment.

FIG. 5 is a side-elevational view of the turn signal buttons/switches secured to a steering column within the driver's compartment of an automobile in accordance with a second embodiment. Advantageously, as illustrated in FIG. 5, the switches 32b, 34b on central hub 16b of steering wheel 14b include alternative indicia that functionally relate to the structure, position and/or identification. For example, switch 32b includes an "R" indicative or representing a right turn so that even when the steering wheel is rotated, the driver will still be able to determine or identify switch 32b for a right turn. Similarly, switch 34b includes an "L" indicative or representing a left turn so that even when the steering wheel is rotated, the driver will still be able to determine or identify switch 34b for a left turn.

Figure 6:
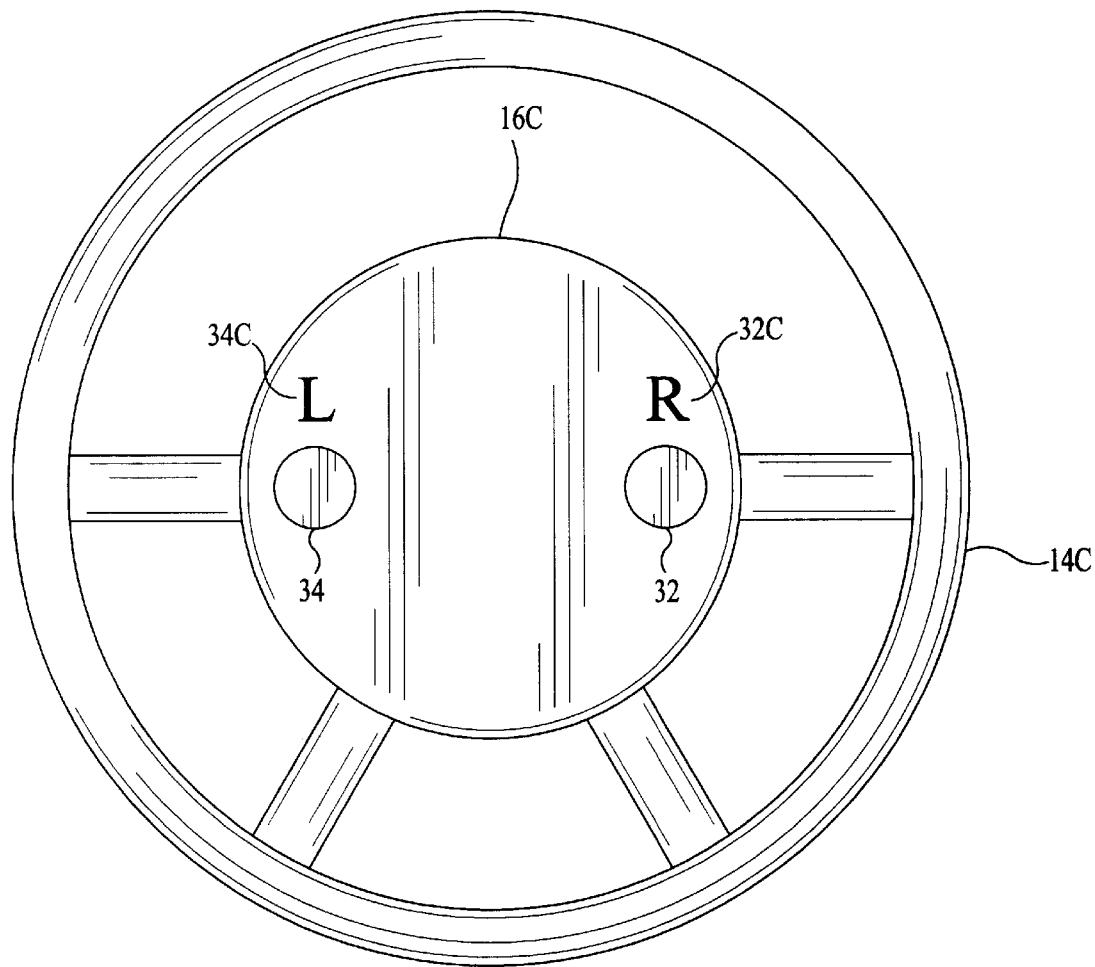
FIG. 6 is a side-elevational view of the turn signal buttons/switches secured to a steering column within the driver's compartment of an automobile in accordance with a third embodiment.

FIG. 6 is a side-elevational view of the turn signal buttons/switches secured to a steering column within the driver's compartment of an automobile in accordance with a third embodiment. Advantageously, as illustrated in FIG. 6, the switches 32, 34 on central hub 16c of steering wheel 14c include indicia in proximity thereto that functionally relate to the structure, position and/or identification. For example, indicia 32c includes an "R" indicative or representing a right turn so that even when the steering wheel is rotated, the driver will still be able to determine or identify indicia 32c for a right turn. Similarly, indicia 34c includes an "L" indicative or representing a left turn so that even when the steering wheel is rotated, the driver will still be able to determine or identify indicia 34c for a left turn.

Figure 7:
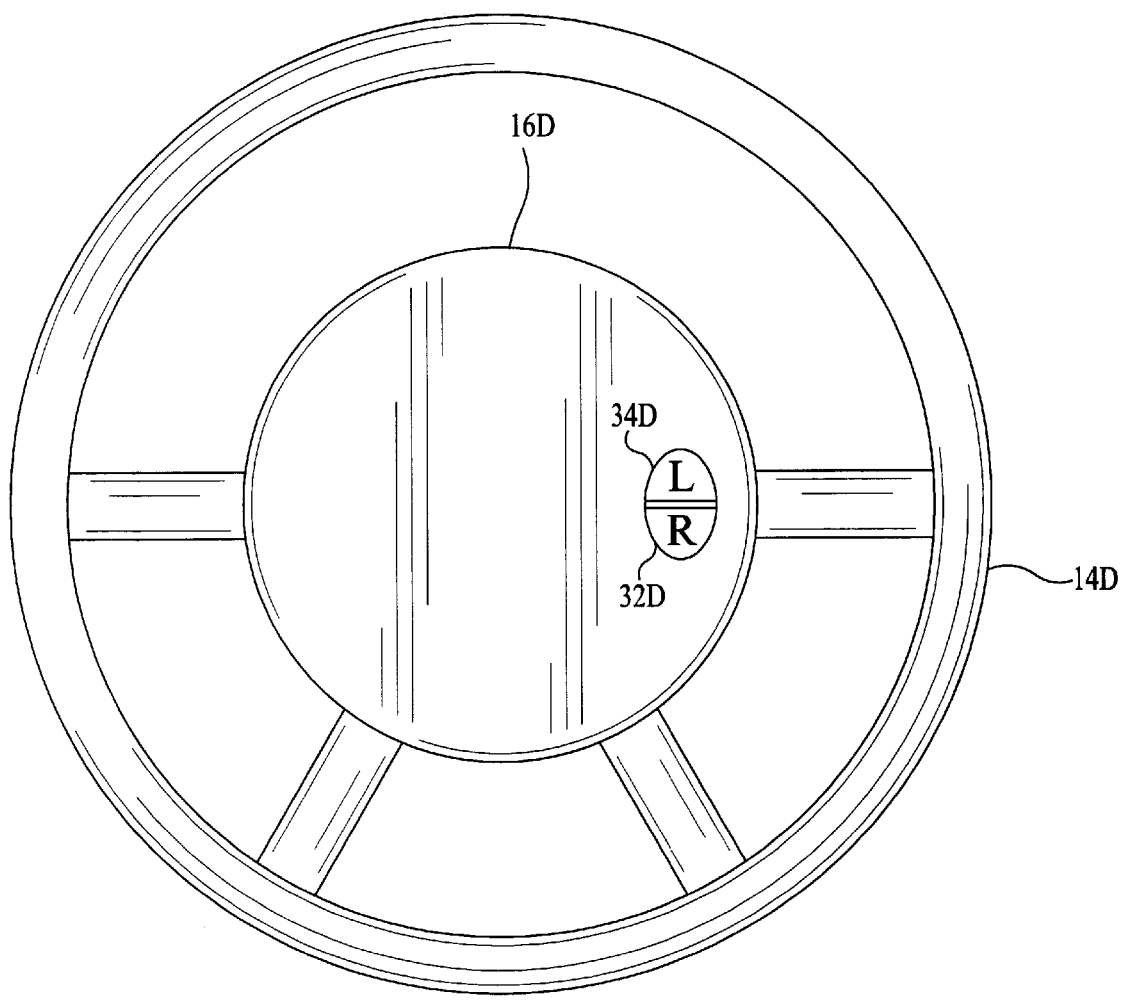
FIG. 7 is a side-elevational view of the turn signal buttons/switches secured to a steering column within the driver's compartment of an automobile in accordance with a fourth embodiment.

FIG. 7 is a side-elevational view of the turn signal buttons/switches secured to a steering column within the driver's compartment of an automobile in accordance with a fourth embodiment. Advantageously, as illustrated in FIG. 7, the switches 32d, 34d on central hub 16d of steering wheel 14d are positioned in close proximity from one another, and include alternative indicia that functionally relate to the structure, position and/or identification. For example, switch 32d includes an "R" indicative or representing a right turn so that even when the steering wheel is rotated, the driver will still be able to determine or identify switch 32d for a right turn. Similarly, switch 34d includes an "L" indicative or representing a left turn so that even when the steering wheel is rotated, the driver will still be able to determine or identify switch 34d for a left turn.

Figure 8:
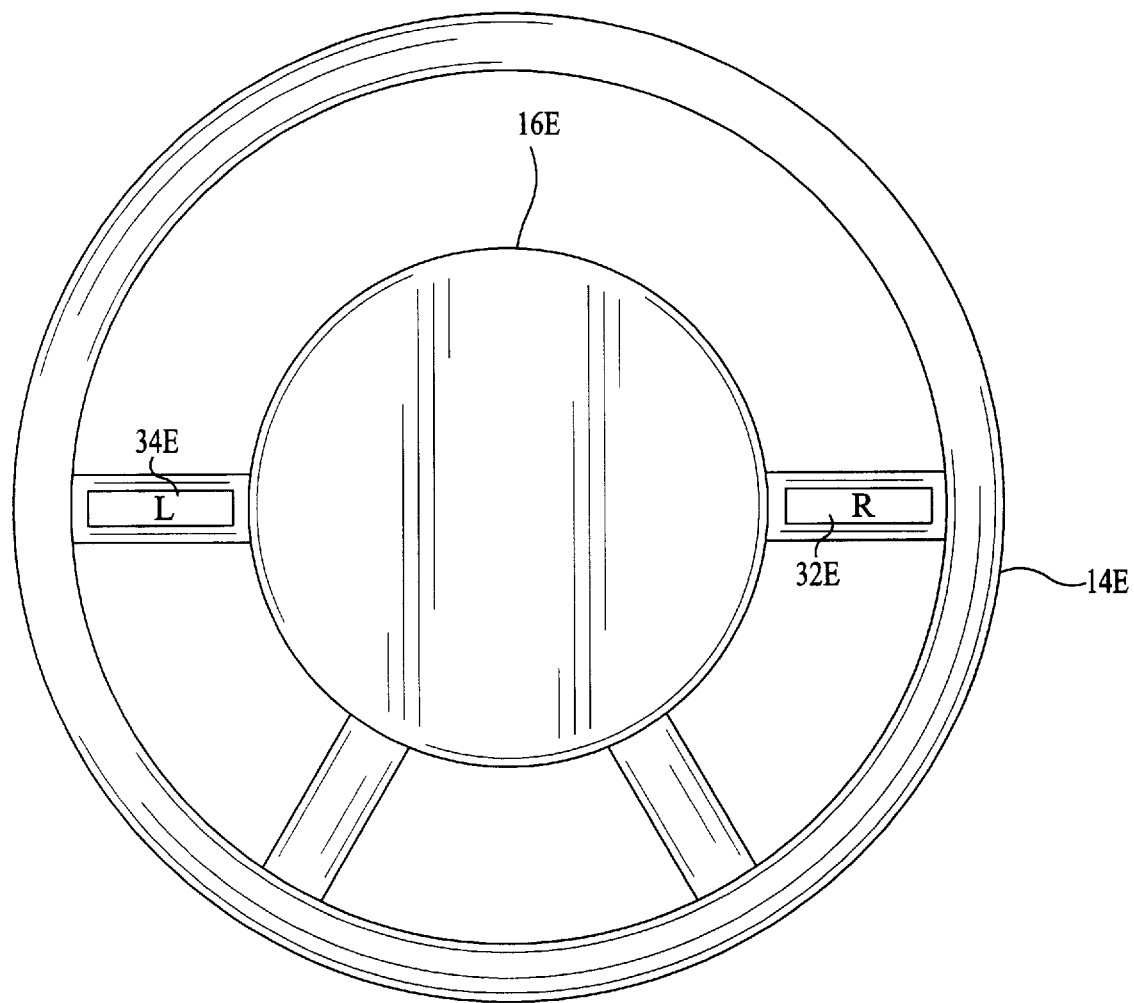
FIG. 8 is a side-elevational view of the turn signal buttons/switches secured to a steering column within the driver's compartment of an automobile in accordance with a fifth embodiment.

FIG. 8 is a side-elevational view of the turn signal buttons/switches secured to a steering column within the driver's compartment of an automobile in accordance with a fifth embodiment. Advantageously, as illustrated in FIG. 8, the switches 32e, 34e on central hub 16e of steering wheel 14e include indicia in proximity thereto that functionally relate to the structure, position and/or identification. For example, switch 32e includes an "R" indicative or representing a right turn so that even when the steering wheel is rotated, the driver will still be able to determine or identify indicia 32e for a right turn. Similarly, indicia 34e includes an "L" indicative or representing a left turn so that even when the steering wheel is rotated, the driver will still be able to determine or identify indicia 34e for a left turn. As illustrated in FIG. 8, switches 32e, 34e are located on the spokes of the steering wheel. However, switches 32e, 34e may also be located on the circumferential handle as well or in the alternative.

Figure 9:
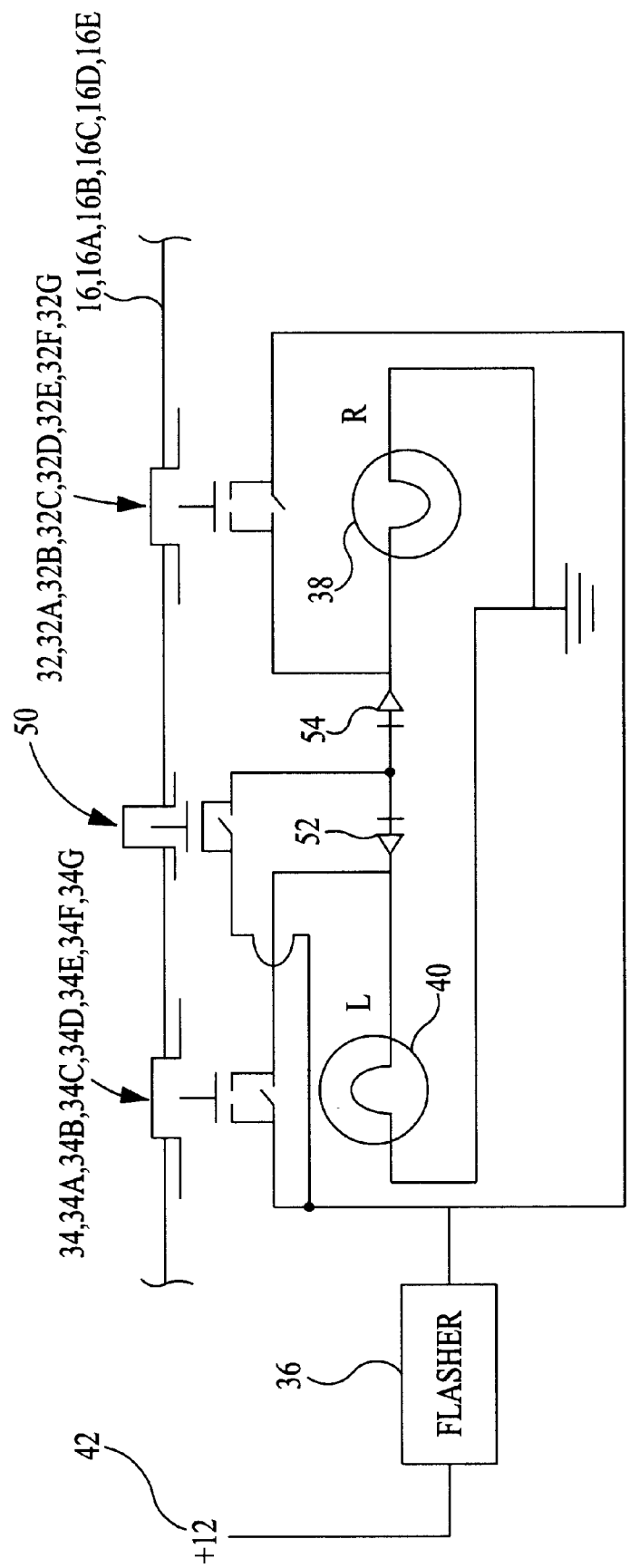
FIG. 9 is a schematic diagram depicting the coupling between the right and left push button switches on the steering wheel and their associated coupling with the flasher circuitry, signal lights, and power source of an automobile in accordance with a sixth embodiment.

FIG. 9 is a schematic diagram depicting the coupling between the right and left push button switches on the steering wheel and their associated coupling with the flasher circuitry, signal lights, and power source of an automobile in accordance with a sixth embodiment. In FIG. 9, the right push button switch 32, 32a, 32b, 32c, 32d, 32e, 32f or 32g has, for example, an electrically conductive terminal adapted to be coupled between flasher circuitry 36 and right turn signal lights 38 of an automobile. The left push button switch 34, 34a, 34b, 34c, 34d, 34e, 34f or 34g has an electrically conductive terminal adapted to be coupled between flasher circuitry 36 and left turn signal lights 40 of an automobile. Optional hazard switch 50 activates simultaneously turn signal lights 38, 40 for indication on steering wheel 16, 16a, 16b, 16c, 16d or 16e. Zenier diodes 52, 54 are used to prevent current from flowing between turn signal indicators/buttons, when individual turn signal buttons are activated or depressed.

The right push button switch optionally has a depressed orientation adapted for completing a circuit between the right turn signal lights, flasher circuitry, and power supply 42 of an automobile to thereby activate the right turn signal lights. The right push button switch also optionally has a released orientation for breaking the circuit between the right turn signal lights, flasher circuitry, and power supply to thereby de-activate the right turn signal lights. The left push button switch optionally has a depressed orientation adapted for completing a circuit between the left turn signal lights, flasher circuitry, and power supply of an automobile to thereby activate the left turn signal lights. The left push button switch also optionally has a released orientation for breaking the circuit between the left turn signal lights, flasher circuitry, and power supply of an automobile to thereby de-activate the left turn signal lights.

When a driver wishes to indicate a right turn, he can depress the right push button switch 32, 32a, 32b, 32c, 32d, 32e, 32f or 32g while simultaneously holding the steering wheel 14, 14a, 14b, 14c, 14d, 14e, 14f or 14g with both hands. Likewise, when a driver wishes to indicate a left turn, he can depress the left push button switch 34 while simultaneously holding the steering wheel with both hands.

Advantageously, the turn signal lights are disposed beneath and/or substantially beneath or sufficiently beneath right and left push button switches 32, 32a, 32b, 32c, 32d, 32e, 32f or 32g, 34, 34a, 34b, 34c, 34d, 34e, 34f or 34g such that the light emitted therefrom permeates through the right and left push button switches. This can be facilitated by the right and left push button switches being formed of transparent material or of a material of similar characteristics that may allow light to pass therethrough and/or be illuminated itself from the turn signal lights 38, 40, as is described below in further detail.

Figure 10:
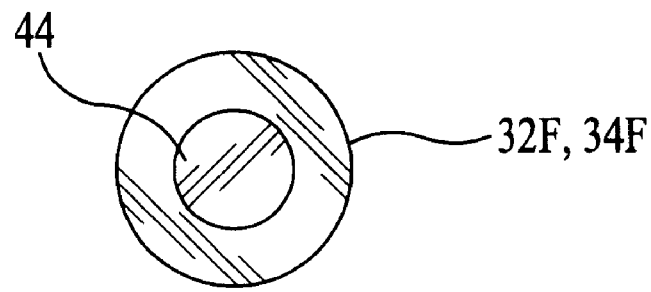
FIG. 10 is a top view of the turn signal buttons/switches in accordance with a seventh embodiment.

FIG. 10 is a top view of the turn signal buttons/switches in accordance with a seventh embodiment. In FIG. 10, switches 32f, 34f include a window, hole cavity, or more transparent area 44 than the remaining switch area to allow light to illuminate or radiate therethrough to advantageously provide the driver feedback as to the active status of the turn signal indicator that is disposed on the steering wheel in various locations described above.

Figure 11:
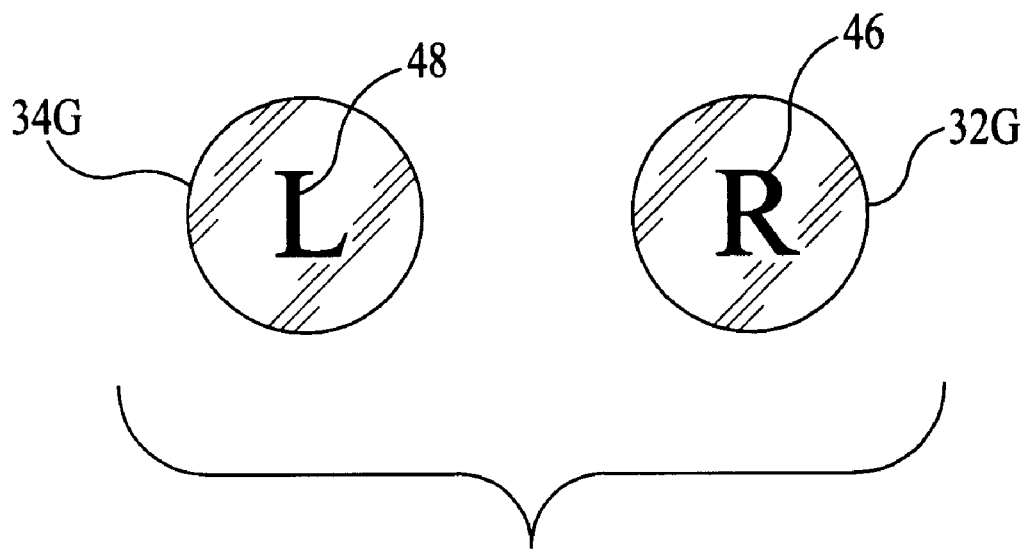
FIG. 11 is a top view of the turn signal buttons/switches in accordance with a seventh embodiment.

FIG. 11 is a top view of the turn signal buttons/switches in accordance with a seventh embodiment. In FIG. 11, switch 32g includes a window, hole cavity, or more transparent area 46 that is shaped in the form of indicia indicative of the direction of the turn signal. Window, hole cavity, or more transparent area "R" 46 is generally more transparent than the remaining switch area to allow light to illuminate or radiate therethrough to advantageously provide the driver feedback as to a combination of the direction of the right turn signal and the active status of the turn signal indicator that is disposed on the steering wheel in various locations described above.

Of course, other means may be used to allow the light to pass through the push button switch, for example, between the interface area that the push button switch forms with the hub, spokes or handle. In addition, while the push buttons have been shown to incorporate an electrically conductive switch action, other switches or mechanisms may also be used to perform the same/similar function, i.e., activating the turn signal. Further, the directivity of the light from the turn signal lights may be enhanced or changed via other means, such as tunnels, cavities and the like, to direct the light therefrom to the turn signal switches.

Figure 12:
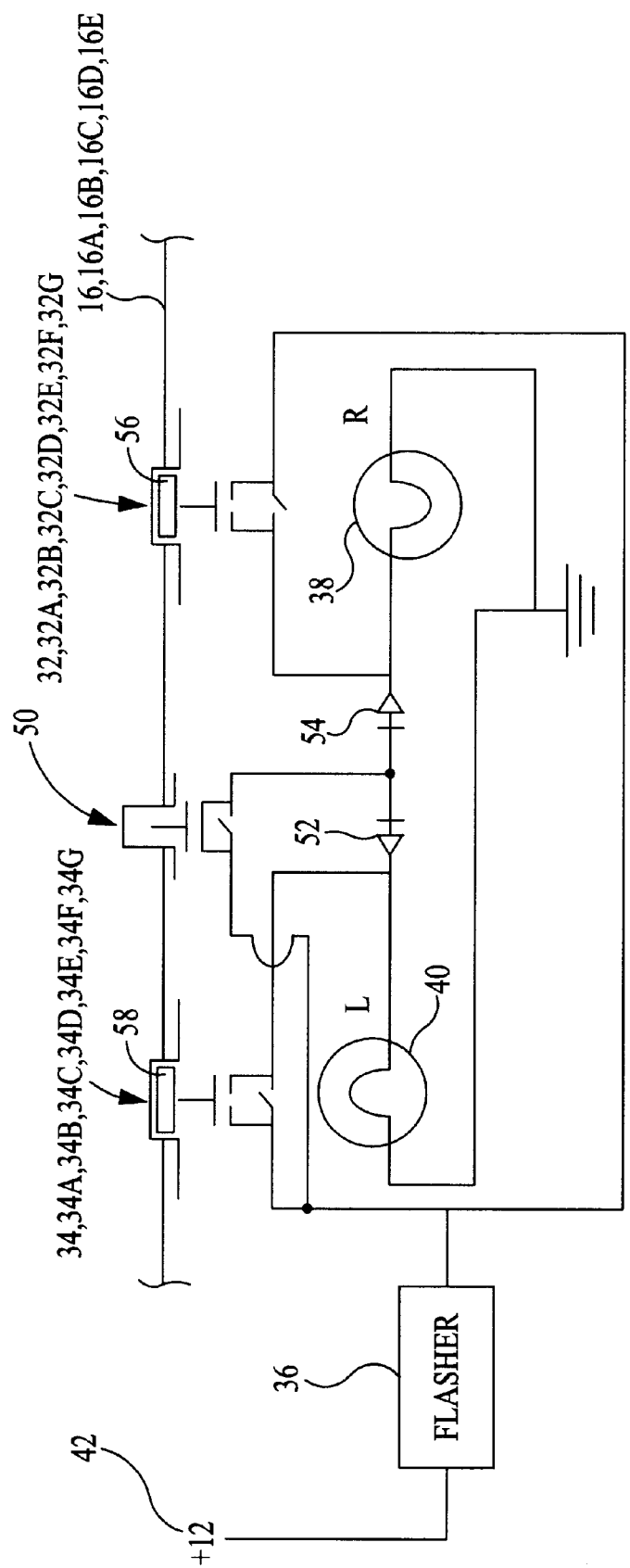
FIG. 12 is a schematic diagram depicting the coupling between the right and left push button switches on the steering wheel and their associated coupling with the flasher circuitry, signal lights, and power source of an automobile in accordance with a ninth embodiment.

FIG. 12 is a schematic diagram depicting the coupling between the right and left push button switches on the steering wheel and their associated coupling with the flasher circuitry, signal lights, and power source of an automobile in accordance with a ninth embodiment. In FIG. 12, optional hazard switch 50 activates simultaneously turn signal lights 38, 40 for indication on steeling wheel 16, 16a, 16b, 16c, 16d or 16e. Zenier diodes 52, 54 are used to prevent current from flowing between turn signal indicators/buttons, when individual turn signal buttons are activated or depressed. In addition, standard vibration sensors 56, 58 are also optionally connected to the turn signal switches for activation, simultaneous with, or in the alternative to, turn signal lights 38, 40.

Accordingly, as described above, the right push button switch has, for example, an electrically conductive terminal, or is used in combination with an other suitable switching mechanism, adapted to be coupled between flasher circuitry and right turn signal lights of an automobile (not shown). The left push button switch has, for example, an electrically conductive terminal, or is used in combination with an other suitable switching mechanism, adapted to be coupled between flasher circuitry and left turn signal lights of an automobile. The right push button switch optionally has a depressed orientation adapted for completing a circuit between the right turn signal lights, flasher circuitry, and a power supply of an automobile to thereby activate the right turn signal lights. The right push button switch optionally also has a released orientation for breaking the circuit between the right turn signal lights, flasher circuitry, and power supply to thereby de-activate the right turn signal lights.

The left push button switch optionally has a depressed orientation adapted for completing a circuit between the left turn signal lights, flasher circuitry, and power supply of an automobile to thereby activate the left turn signal lights. The left push button switch also optionally has a released orientation for breaking the circuit between the left turn signal lights, flasher circuitry, and power supply of an automobile to thereby de-activate the left turn signal lights. When a driver wishes to indicate a right turn, he/she can depress the right push button switch while simultaneously holding the steering wheel with both hands. Likewise, when a driver wishes to indicate a left turn, he can depress the left push button switch while simultaneously holding the steering wheel with both hands.

Of course, other shapes and/or configurations and/or designs of the switches, lights, steering wheel, indicia on or near the buttons, may be used. Other types of switches may also be used to activate/deactivate the turn signal lights.

The present invention is adapted for use with motor vehicles and enables a person to activate turn signal lights without taking his hands off of the steering wheel. The present has a pair of push button switches, for example, one on each side of the steering wheel. Buttons are recessed in the wheel at, for example, the three o'clock and nine o'clock positions, near the outside circumference of the hub. The right push button is depressed when signalling an intent to make a right turn, and the left push button is pressed when signalling an intent to make a left turn.

Standard wiring extends from the underside of the buttons, through the steering wheel, to a pair of relays, and finally to each of the lights. The push button switches are, for example, normally open, with the circuit closing to allow electrical power to flow through the flasher circuitry, through a given push button, and to the signal lights when a given push button is depressed. Wiring attaches to the fuse box in the normal fashion, and the power source is the vehicle's 12 volt battery.

In use, when the driver is about to make a left turn, he/she simply depresses the left button on the steering wheel rather than removing his hand to access the turn lever as on prior art turn signalling devices. After the turn has been completed, the button returns to its original released position. By having the present invention installed in his/her vehicle, a driver need never remove his/her hands from the steering wheel to indicate a turn. Driving is a bit safer because the driver's hands remain on the wheel. It is also more convenient for the driver since the buttons may be easily accessed by simply using a thumb on the right or left hand.

Greater convenience for the driver should result in fewer occurrences of forgetting to activate the blinker. The electrical connection between the push button switches and turn signal circuitry of the automobile would pass through the steering wheel and connect in parallel with the existing system. The present invention may also be used in combination with the standard turn signal directional which comprises a lever off the steering wheel with the light indicators generally on the dash board area, to minimize initial training problems.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An automobile including an automobile steering wheel and turn signal indicator for allowing a driver of the automobile to signal for a turn, the automobile steering wheel comprising a handle/hub arrangement adapted to be coupled to a steering column of the automobile, at least one spoke disposed about the handle/hub and horizontally extended outward therefrom to the handle/hub, and left and right turn signal indicators disposed on at least one of the handle/hub and spokes of the steering wheel, and each of the left and right turn signal indicators equipped with or positionally near first indicia disposed on or near said left and right turn signal indicators indicating the appropriate direction when the steering wheel changes orientation, said first indicia comprising left and right indicia at least one of disposed on and directly corresponding to said left and right turn signal indicators, said left and right indicia indicating at least substantially corresponding left and right directions to direct the automobile even when the steering wheel changes orientation including a 180 degree change in orientation, and each of the left and right turn signal indicators optionally equipped with a first turn signal device responsively connected to said left and right turn signal indicators indicating a working status of said left and right turn signal indicators, a second turn signal device responsively connected to said left and right turn signal indicators indicating the appropriate direction when the steering wheel changes orientation and substantially simultaneously indicating a working status of said left and right turn signal indicators and substantially within a peripheral vision of the driver, and a hazard device responsively connected to said left and right turn signal indicators activating substantially simultaneously said left and right turn signal indicators.

2. An automobile steering wheel and turn signal indicator according to claim 1, wherein said left and right turn signal indicators comprise or substantially comprise or partially comprise transparent or substantially transparent material.

3. An automobile steering wheel and turn signal indicator according to claim 1, wherein said left and right turn signal indicators comprise or substantially comprise or partially comprise one or more windows.

4. An automobile steering wheel and turn signal indicator according to claim 1, wherein said left and right turn signal indicators form an interface area with the steering wheel, permitting light to pass therethrough to indicate the working status of at least one of the left and right turn signal indicators.

5. An automobile steering wheel and turn signal indicator according to claim 1, wherein said left turn signal indicator include the indicia L thereon to indicate a left directional, and said right turn signal indicator includes the indicia R thereon to indicate a right directional.

6. An automobile steering wheel and turn signal indicator according to claim 5, wherein said left and right turn signal indicators comprise or substantially comprise or partially comprise transparent or substantially transparent material.

7. An automobile steering wheel and turn signal indicator according to claim 5, wherein said left and right turn signal indicators comprise or substantially comprise or partially comprise one or more windows.

8. An automobile steering wheel and turn signal indicator according to claim 1, wherein said left and right turn signal indicators are shaped respectively as an L and an R and form a respective L and R shaped interface area with the steering wheel, permitting light to pass therethrough to indicate the working status of at least one of the left and right turn signal indicators.

9. An automobile steering wheel and turn signal indicator according to claim 1, wherein said turn signal lights comprise left and right turn signal lights, and the left and right turn signal lights are disposed underneath or substantially underneath or partially underneath the left and right turn signal indicators respectively, to facilitate passage of light at least one of therethrough and around thereof.

10. An automobile including an automobile steering wheel and turn signal indicator for allowing a driver of the automobile to signal for a turn, the automobile steering wheel comprising a handle/hub arrangement adapted to be coupled to a steering column of the automobile, at least one spoke disposed about the handle and the hub and horizontally extended outward therefrom to the handle and the hub, and left and right turn signal indicators comprising at least one user actuation device to actuate the left and right turn signal indicators, the left and right turn signal indicators disposed on at least one of the handle, the hub and the at least one spoke of the steering wheel, and each of the left and right turn signal indicators equipped with or positionally near first indicia disposed on or near said left and right turn signal indicators indicating the appropriate direction when the steering wheel changes orientation, said first indicia comprising left and right indicia at least one of disposed on and directly corresponding to said left and right turn signal indicators, said left and right indicia indicating at least substantially corresponding left and right directions to direct the automobile even when the steering wheel changes orientation including a 180 degree change in orientation, and each of the left and right turn signal indicators optionally equipped with a first turn signal device responsively connected to said left and right turn signal indicators indicating a working status of said left and right turn signal indicators, a second turn signal device responsively connected to said left and right turn signal indicators indicating the appropriate direction when the steering wheel changes orientation and substantially simultaneously indicating a working status of said left and right turn signal indicators and substantially within a peripheral vision of the driver, and a hazard device responsively connected to said left and right turn signal indicators activating substantially simultaneously said left and right turn signal indicators.

11. An automobile steering wheel and turn signal indicator according to claim 10, wherein said left and right turn signal indicators comprise or substantially comprise or partially comprise at least one of transparent material, substantially transparent material, and one or more windows.

12. An automobile steering wheel and turn signal indicator according to claim 10, wherein said left and right turn signal indicators form an interface area with the steering wheel, permitting light to pass therethrough to indicate the working status of at least one of the left and right turn signal indicators.

13. An automobile steering wheel and turn signal indicator according to claim 10, wherein said left turn signal indicator includes the indicia L thereon to indicate a left directional, and said right turn signal indicator includes the indicia R thereon to indicate a right directional.

14. An automobile steering wheel and turn signal indicator according to claim 10, wherein said left and right turn signal indicators are shaped respectively as an L and an R and form a respective L and R shaped interface area with the steering wheel, permitting light to pass therethrough to indicate the working status of at least one of the left and right turn signal indicators.

15. An automobile steering wheel and turn signal indicator according to claim 10, wherein said turn signal lights comprise left and right turn signal lights, and the left and right turn signal lights are disposed underneath or substantially underneath or partially underneath the left and right turn signal indicators respectively, to facilitate passage of light at least one of therethrough and around thereof.

* * * * *